(12) United States Patent  
Morris

(10) Patent No.: US 9,107,194 B2
(45) Date of Patent: Aug. 11, 2015

(54) DYNAMIC MESH NETWORKS

(75) Inventor: Roy Morris, Bothell, WA (US)

(73) Assignee: Crimson Corporation, Dover, DE (US)

( * ) Notice: Subject to any disclaimer, the term of this patent is extended or adjusted under 35 U.S.C. 154(b) by 398 days.

(21) Appl. No.: 13/127,350

(22) PCT Filed: Nov. 4, 2009

(86) PCT No.: PCT/US2009/005973
§ 371 (c)(1),
(2), (4) Date: Aug. 23, 2011

(87) PCT Pub. No.: WO2010/053544
PCT Pub. Date: May 14, 2010

(65) Prior Publication Data
US 2011/0292876 A1 Dec. 1, 2011

Related U.S. Application Data

(60) Provisional application No. 61/198,332, filed on Nov. 4, 2008.

(51) Int. Cl.
*H04W 84/10* (2009.01)
*H04W 76/02* (2009.01)
*H04W 4/06* (2009.01)
*H04W 84/22* (2009.01)
*H04W 88/04* (2009.01)

(52) U.S. Cl.
CPC ............ *H04W 76/022* (2013.01); *H04W 76/02* (2013.01); *H04W 4/06* (2013.01); *H04W 84/22* (2013.01); *H04W 88/04* (2013.01)

(58) Field of Classification Search
CPC ............................ H04W 76/02; H04W 76/022
USPC .......................................... 370/328, 254, 401
See application file for complete search history.

(56) References Cited

U.S. PATENT DOCUMENTS 7,924,927 B1 * 4/2011 Boesjes .................... 375/240.26
2004/0190477 A1 9/2004 Olson et al.

(Continued)

OTHER PUBLICATIONS

International Search Report Dated Jun. 1, 2010, for International Patent Application No. PCT/US2009/005973 Filed Nov. 4, 2009.

(Continued)

*Primary Examiner* — Donald Mills
*Assistant Examiner* — Henry Baron
(74) *Attorney, Agent, or Firm* — Austin Rapp & Hardman

(57) ABSTRACT

In an embodiment, a wireless data exchange network includes a wireless device (WD) operating under a wireless network communications protocol, a wireless access point (AP), operatively linked to the WD and a wired network, and operating under the wireless network communications protocol, and a wireless mobile device (WMD) capable of operatively linking with the WD and the AP, and operating under the network communications protocol. In another embodiment, a method for dynamically establishing a wireless data link between the WD and the AP wherein the WMD functions as a bridge there between, where the method may include determining the state of the data exchange link between the WD and the AP, selectively receiving and retransmitting data, by the WMD, from the WD to the AP and from the AP to the WD; and maintaining the wireless network communications protocol of the WMD during reception and retransmission of data between itself and the WD or the AP.

8 Claims, 3 Drawing Sheets

(56) References Cited

U.S. PATENT DOCUMENTS

| | | | |
|---|---|---|---|
| 2007/0002766 A1 | 1/2007 | Park et al. | |
| 2007/0008889 A1* | 1/2007 | Seo | 370/232 |
| 2007/0147338 A1 | 6/2007 | Chandra et al. | |
| 2008/0130596 A1* | 6/2008 | Kalhan | 370/338 |
| 2008/0205360 A1* | 8/2008 | Ren et al. | 370/338 |
| 2010/0103909 A1 | 4/2010 | Lee et al. | |
| 2011/0004801 A1* | 1/2011 | Duffy et al. | 714/749 |

OTHER PUBLICATIONS

Written Opinion Dated Jun. 1, 2010, for International Patent Application No. PCT/US2009/005973 Filed Nov. 4, 2009.

* cited by examiner

Fig. 1
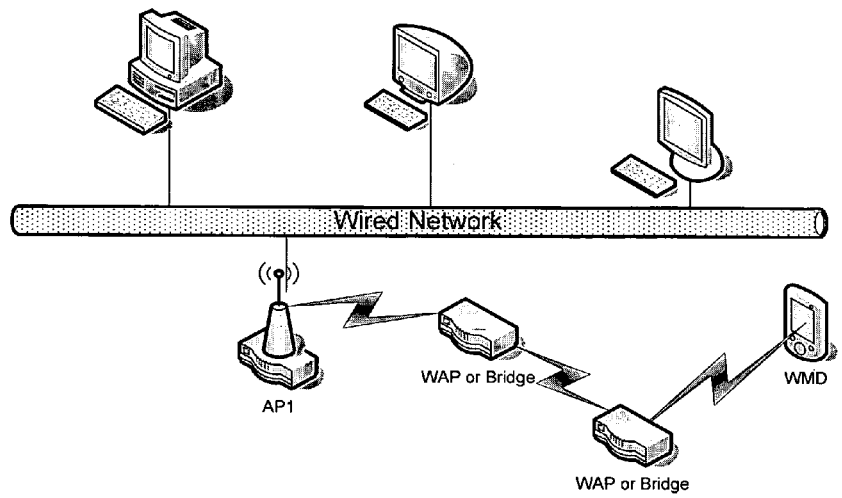
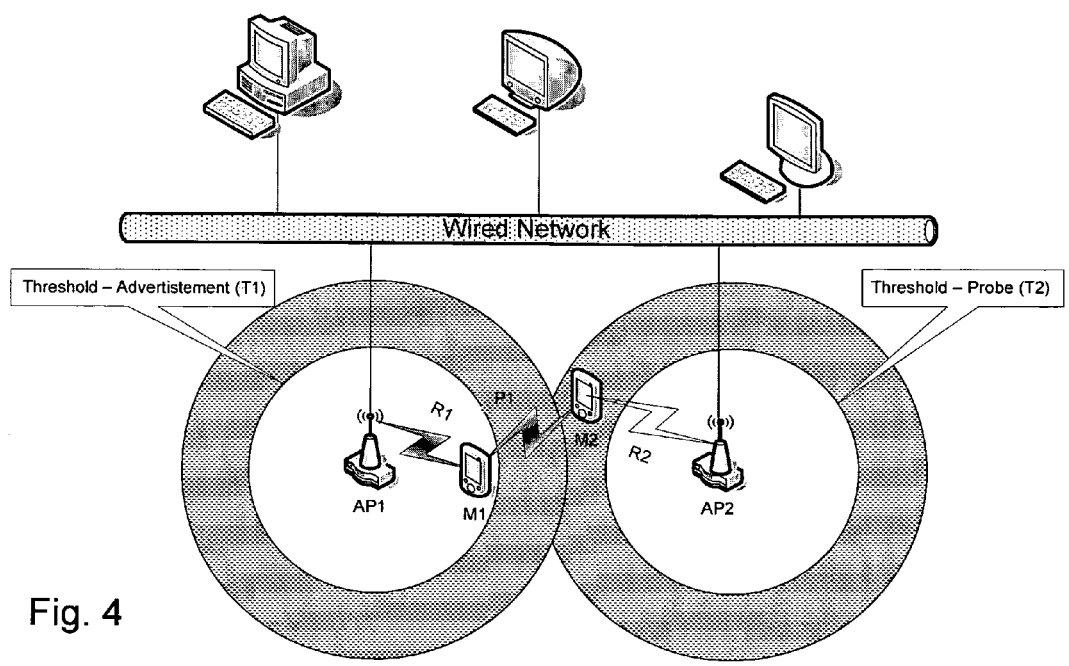
Fig. 4

Fig. 5
Fig. 6
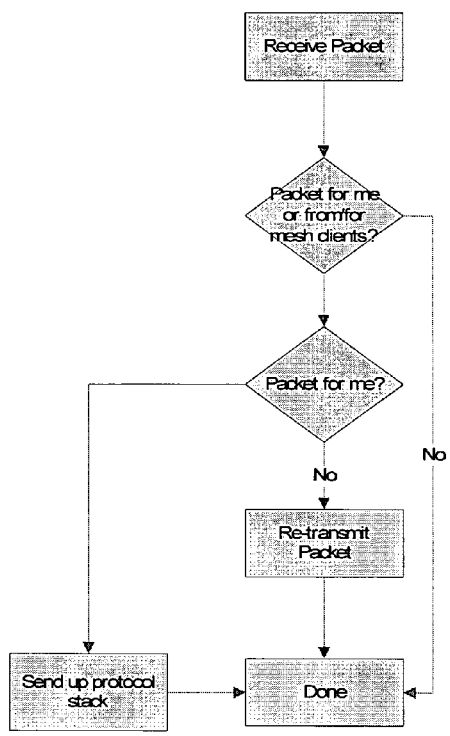
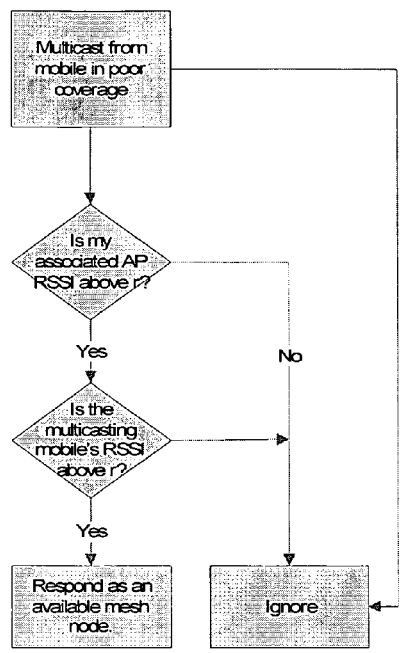

DYNAMIC MESH NETWORKS

PRIORITY CLAIM

The present application is a national phase application filed pursuant to 35 USC §371 of International Patent Application No. PCT/US2009/005973, filed 4 Nov. 2009; which application claims the benefit of U.S. Provisional Patent Application No. 61/198,332, filed 4 Nov. 2008, now expired; all of the foregoing applications are incorporated herein by reference in their entireties.

BACKGROUND OF THE INVENTION

Wireless mesh networks are gaining in popularity for "last mile" broadband access. A wireless mesh network typically consists of wireless WiFi or WiMax access points (generally referred to herein as "wireless access points" or "WAPs" unless otherwise stated or apparent from the context of usage) or network bridges that eventually connect to an access point that provides broadband access (generally referred to herein as an "access point" or "AP"). FIG. 1 is a simple example of a multi-hop static wireless mesh network where each WAP or AP is considered a logical "node".

Currently IEEE is working on the 802.11s standard, which would define interoperability in wireless mesh networks. This work mostly has to do with extensions to the 802.11 media access layer, such as access points sharing node information to create a database of nodes to determine the best route to effectuate and/or maintain broadband data throughput. Mesh nodes are typically stationary and are dedicated to that single purpose (routing packets to/from broadband access points or other mesh nodes).

When creating wireless networks in a physical space, an initial site survey is usually conducted to determine where to place access points to ensure optimal coverage in the most cost effective manner. Should the physical constitution of the space changes, for example a metal rack is placed in front of an existing access point, poor coverage areas often result. Wireless dependent devices now operating in those areas will have poor or no connectivity, requiring another site survey and movement of one or more access points (or even the possible addition of a new access point). Thus, while a rather simple solution exists, it involves labor and equipment resources. And if the space constitution changes frequently, the expenses for multiple iterations of these resources can quickly become material.

SUMMARY OF THE INVENTION

The invention is directed to dynamic mesh networks, methods for establishing such networks, and methods for establishing or improving a communications link between a device and a network when the device is not within range of the network or the quality of the link is less than desired. System embodiments of the invention in a first respect comprise at least one wireless mobile device ("WMD"), a first WAP device operatively linked to a first network, and a first wireless device ("WD") operatively linkable to the first WAP device, wherein the at least one WMD is linkable to the first WD and to the first WAP device, and wherein the at least one WMD may function to establish a communications link (or enhance a communications link) between the first WD and the first WAP device. Method embodiments of the invention in the first respect comprise establishing (or improving) a communications link between a first WD and a first WAP device that is operatively linkable (or linked) to the first WD and operatively linked to a first network.

In operation, method embodiments of the invention in the first respect allow the at least one WMD to engage in signal bridging, thereby improving any communications deficiency between the first WD and the first WAP device, or establishing such communications. Prior to engaging in signal bridging, however, it is preferable to assess the desirability of establishing such a bridge. The decision to interpose with the at least one WMD can be accomplished through at least several non-exclusive interposition opportunity determinations, which will now be described.

A first interposition opportunity determination comprises the first WD and/or the first WAP communicating the state of bidirectional data communication between them. This act of broadcast communication can be a wireless broadcast by either device or both, a wireless broadcast by the first WD and a network-based communication by the first WAP, or just a network-based communication by the first WAP that can be accessed by the WMD. This form of interposition opportunity is referred to herein as "infrastructure-based push communication" (hereinafter "IBPC"), and is intended to provide the assessment and/or link instructions to the WMD. If a WMD is present within operative range of both the first WD and the first WAP device, and if the state of bidirectional communication is such that communication between the first WD and the first WAP device would benefit from the WMD acting as a bridge, then an interposition opportunity exists. Thus, by allowing the first WD and the first WAP device to communicate through the WMD, the state of the bidirectional communication can be improved. Such instruction can originate within the wireless network or outside of it.

The state of bidirectional communication between the first WD and the first WAP device can be represented in many ways by differing metrics, including without limitation, RSSI values, packet resend requests, actual packet resends, selection of data transmission rates, which may be based upon QoS parameters, error counts, ping time-outs, etc. In one series of invention embodiments, the state of bidirectional communication between the first WD and the first WAP device comprises transmission of such information via a layer 2 multicast by either or both the first WD and the first WAP.

An example of an IBPC opportunity follows: A WAP (AP) device is in bidirectional communication with a wireless device (WD), but the effective communication rate is less than optimal due to poor signal strength and lost data packets. A wireless mobile device (WMD) enters the effective communications range of both the AP and the WM, and all devices recognize each other. As part of the recognition protocol, both the AP device and the WD broadcast their respective link states, which are received by the WMD. The WMD then determines directly or indirectly, based upon its link states with both devices, if its communication states between the AP device and between the WD are better than those broadcast to it. Upon such determination and if true, the AP device and the WD are informed either directly by the WMD or indirectly through other means, that the WMD can act as a communications bridge between the AP device and the WD. The WMD may optionally provide its link states. Depending upon the embodiment, the selection of communication links can be made within the wireless network, e.g., if the WD is going to transmit, it can send data to the WMD as opposed to the AP device, or outside the wireless network, e.g., a server requesting information from the $WD_1$ can instruct it to use the link comprising the WMD.

A second interposition opportunity determination comprises an "infrastructure interrogating communication", hereinafter an IIC. Unlike an IBPC, an IIC is initiated by the at least one WMD, but otherwise exploits information that might otherwise be broadcast under the IBPC model. Under this protocol, the at least one WMD broadcasts a request for information to some or all available wireless devices and/or access points. In embodiments where only some wireless devices are contacted, the selection may be based upon characteristics of the wireless medium (e.g., RSSI values, bandwidth load, etc.). In response to this interrogation, some or all available wireless devices and/or access points respond with the state of their communications link(s). Once the requested data has been received, and if the state of bidirectional communication between any two devices within the range of the WMD is such that communication there between would benefit from the WMD acting as a bridge, then an interposition opportunity exists.

An example of an IIC opportunity follows: A WAP (AP) device is in bidirectional communication with a first wireless device (WD), but the effective communication rate is less than optimal due to wireless network characteristics such as poor signal strength and/or lost data packets. A wireless mobile device (WMD) enters the effective communications range of both the AP device and the WD, and all devices recognize each other. As part of the recognition protocol, the WMD interrogates both the AP device and the WD, which in response broadcast their respective link states, and which is received by the WMD. The WMD then determines, based upon its link states with both devices, if its communication states are better than those broadcast to it. Upon such determination and if true, the WMD informs the AP device and the WD that it can act as a communications bridge there between, and may optionally provide its link states. Depending upon the embodiment, the selection of communication links can be made within the wireless network, e.g., if the WD is going to transmit, it can send data to the WMD as opposed to the AP device, or outside the wireless network, e.g., a server requesting information from the WD can instruct it to use the WMD.

A third interposition opportunity determination comprises a subset of the above opportunities and is based solely on "comparative signal strength assessments", hereinafter "CSSA". This opportunity can also be thought of as opportunistic. Under CSSA protocol, at least one wireless mobile device (WMD) assesses the signal strength between it and a wireless device (WD), and between it and a WAP (AP) device. If the values for both of these assessments represent better signal qualities than that between the WD and the AP device, then the at least one WMD is a suitable candidate for signal bridging. Because it is necessary to ascertain the nature/quality of any communications link between the WD and the AP device, such information can be pushed by one or both devices, or such information can be obtained by the at least one WMD through interrogation/polling.

System embodiments of the invention in a second respect comprise at least one wireless mobile device (WMD), a first WAP device operatively linked to a first network, a second WAP device operatively linked to the first network, and a first wireless device (WD) operatively linkable to the first WAP device, wherein the at least one WMD is linkable to the first WD and to the second WAP device, and wherein the at least one WMD may function to establish a communications link (or enhance a communications link) between the first WD and the first network. Method embodiments in a second respect of the invention comprise establishing (or improving) a communications link between a first WD that is operatively linkable (or linked) to a first WAP device, which is operatively linked to a first network, and the first network by using resources available through a second WAP device that is also operatively linked to the first network.

In operation, method embodiments of the invention in the second respect allow the at least one WMD to engage in signal bridging between the first WD and the first network by permitting a second WAP device to function as the network interface in place of the first WAP device, thereby removing any communications deficiency between the first WD and the first WAP device. In these embodiments, therefore, the at least one WMD does not establish (or improve upon) communications with the first WAP device. Instead, it acts as a bridge between the first WD and the second WAP device. As in the first instances, it is preferable to assess the desirability of establishing a communications bridge by interposition. The decision to interpose with the at least one WMD in these second respects can be accomplished through at least the several non-exclusive interposition determination opportunities discussed earlier.

In many embodiments, just because an interposition opportunity exists does not mean that it will be exploited. While a myriad of considerations may exist for interposition, representative exploitation criteria comprise whether sufficient bandwidth exists on the at least one WMD (or the second WAP device) to satisfactorily handle the increased data throughput, signal trends of the at least one WMD (i.e., are the communication quality metrics improving or declining), signal trends between the first WD and the first WAP device (i.e., whether the communication quality metrics improving or declining), whether the at least one WMD is permitted on the first network, whether the second WAP device is permitted on the first network, and others known to the skilled practitioner. These determinations may be made by one, some or all wireless devices that are enabled to independently determine under what circumstances an interposition should occur. Alternatively, a network management system (NMS) can manage these settings (conditions surrounding when and how an interposition should occur) as a policy or set of policies that is/are deployed to the wireless mobile device(s) either wired, wirelessly or via a docking mechanism such as USB or Bluetooth link. The NMS may also deploy these policies to a plurality of wireless mobile devices that it is responsible to manage. Any policy settings and the conditions under which they are deployed, as well as the extent of deployment can be determined by a network administrator or administrators.

In the event that exploitation of an interposition opportunity is elected, instructions for the interposition can be issued from a variety of sources. For example, one, some or all wireless devices may be enabled to independently instruct other elements of the system to cooperate in forming the bridging network. Alternatively or in addition to, a server operatively linked to at least the first network may be enabled to instruct other elements of the system to cooperate in forming the bridging network.

The above-referenced interposition instructions can generally take any form necessary to carry out the intended interposition, and depend at least in part upon the constitution of the existing wireless network infrastructure and wireless mobile device(s), the mode of interposition, and related factors. In one series of embodiments, the instructions (or settings) are in the form of a file, such as an XML document, that is distributed to the wireless mobile device(s) as mentioned above. The wireless mobile device(s) parse(s) the XML data to gain the instructions required to determine the interposition. Another possible solution is via a protocol such as SNMP. The WMD would then comprise a management information base (MIB) or equivalent that could also be modified by a remote NMS.

The disclosure given above primarily presumes that the at least one WMD has only a single radio transceiver or adapter. The invention recognizes that more than one radio may be embodied in a single wireless device. In embodiments wherein the WMD comprises two radios, the mobile device advertising a dynamic mesh network (M1) could do so on a second radio and on a channel (i.e. frequency) that is far enough removed from the first radio channel as to not interfere with the channel it is communicating with its associated access point (its primary channel). Furthermore, traffic routing would occur on M1 to/from M2 by routing the traffic to/from primary radio to/from the mesh radio.

As used herein, the term "device" and its plural means any device comprising bi-directional communications abilities, whether portable (mobile) or stationary, wired or wireless; the term "wireless mobile device" or "wireless portable device" and their plurals means any device comprising wireless bi-directional communications abilities that is intentionally operational during physical transport and primarily derives power from a portable power source or from the environment; the term "mesh network" and its plural means a wireless communications network comprising at least two nodes embodied in a heterogeneous wired-wireless communications network wherein at least one node is in wired bidirectional communication with at least a partially wired communications network; the term "WAP device" or WAP and its plural means a device that allows wireless communication devices to connect to a wireless network using Wi-Fi and related standards. The WAP usually connects to a wired network and can relay data between wireless devices and wired devices on the network.

BRIEF DESCRIPTION OF THE DRAWINGS

FIG. 1 is an exemplary illustration of a simple static, multiple hop mesh network;

FIG. 4 is an illustration of a wireless network having first and second access point wherein a data link between a first wireless mobile device and the first access point has sufficiently degraded that an available second wireless mobile device is used as a bridge to the second access point, which is operatively linked to the same data network as the first access point;

FIG. 5 is a process flow diagram of the re-transmission of mesh client packets; and FIG. 6 is a process flow diagram of the decision to advertise a mesh network.

DESCRIPTION OF INVENTION EMBODIMENTS

The following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Figure 2:
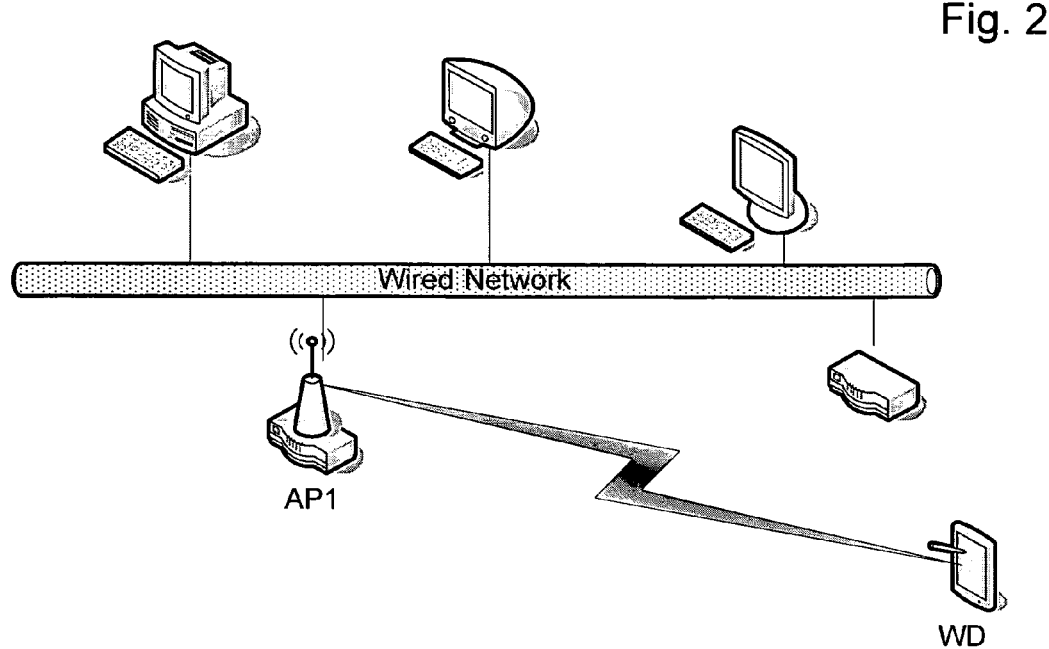
FIG. 2 is an illustration of a conventional wireless network.
Figure 3:
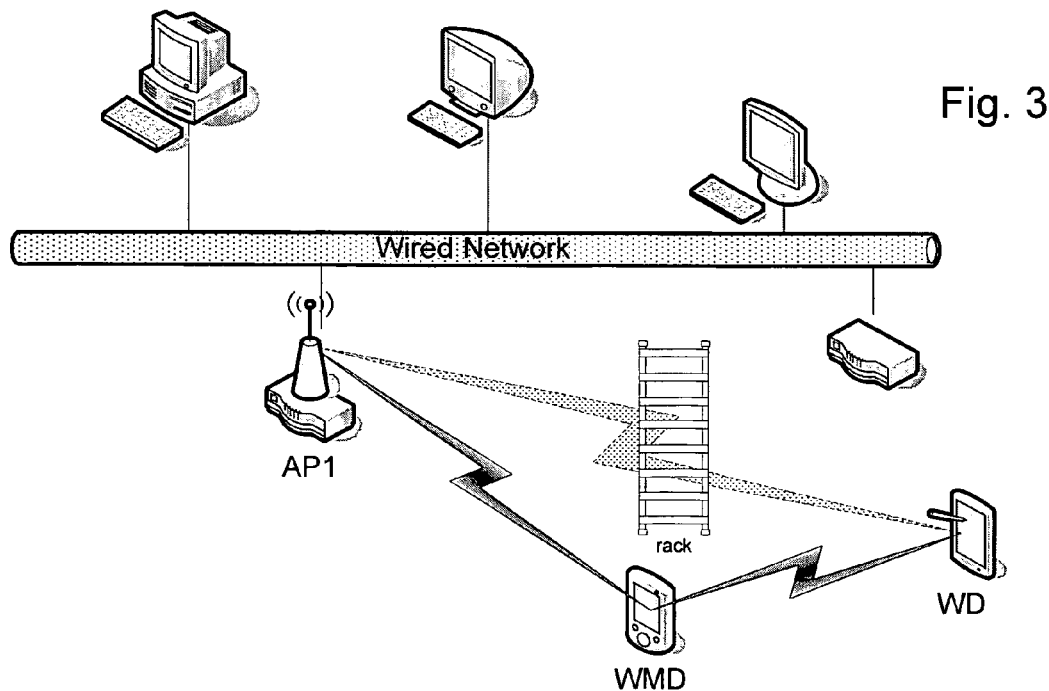
FIG. 3 is an illustration of the wireless network of FIG. 2 where a structure has adversely affected the data link between an access point and a wireless device of the network, and where a wireless mobile device has entered the effective area of the access point to function as a bridge between the wireless device and the access point.

Referring then to FIGS. 2 and 3, a first embodiment of the invention comprises a system for re-routing network data traffic in a wireless network comprising a wireless device (WD) operatively linked to an access point (AP1). The re-routing function results from degradation or elimination of the WD to AP1 data link, due to, for example, environmental factors. In this simplified system, AP1 is compliant with the IEEE 802.11g standard and is operatively linked to a wired data network. Additionally, both WD and a wireless mobile device (WMD) shown in FIG. 3 are IEEE 802.11g compliant (it should be noted that the mobile devices are not IEEE 802.11s enabled; the protocol stack during the described operations remains intact and network applications will continue to function). Each mobile device comprises a single wireless radio and has the ability to assess information relating to any device in which it is in wireless data communication such as node ID, RSSI value for a given link and similar information available under the 802.11g standard and/or known to the skilled practitioner. Moreover, each mobile device is configured to broadcast or advertise mesh network information if the RSSI value between it and a given access point exceeds a predefined threshold value (advertisement threshold value), and probe for a mesh network if the RSSI value between it and a given access point falls below a predefined threshold value (probe threshold value).

Specifically referring to FIG. 2, a data link of sufficient quality exists between AP1 and the WD. However, should an environmental condition manifest that degrades or eliminates this link (such as the introduction of a data communication rack in the preferred vector of link shown in FIG. 3), data communication with AP1 is adversely affected or lost. Because the WD is configured to probe for mesh network information if the RSSI between it and any access point falls below a predetermined value, WD begins to probe for alternative access points or available mesh networks by sending layer 2 multicasts, the content of which will be mesh networking information.

As best shown in FIG. 3, the multicast of the WD is received by the WMD, which is also configured to receive and respond to multicasts or probe requests, and which has in the meantime entered the effective range of AP1. See FIG. 6. Presuming that the RSSI value of the link between it and AP1 is sufficiently high, e.g., above a predetermined threshold value, then data intended for AP1 from the WD will be received and echoed by the WMD to AP1; any data intended for WMD will propagate up the stack as would be the case if the WMD was not acting as a bridge. This process is reflected in FIG. 5. In addition to or in the alternative, the WMD can be configured to advertise mesh network information if the RSSI between it and an access point exceeds a predetermined value, and the WD configured to receive and respond to such advertisement.

Referring to FIG. 4, a second embodiment of the invention comprises a system for re-routing network data traffic in a wireless network comprising a wireless mobile unit having poor or no operative linkage with an operative access point. In this simplified system, two access points (AP1) and (AP2), which are compliant with the IEEE 802.11g standard, are operatively linked to a wired data network. Additionally, there are two IEEE 802.11g compliant mobile devices (M1) and (M2) present within the access points' operable footprints (it should be noted that the mobile devices are not IEEE 802.11s enabled; the protocol stack during the described operations remains intact and network applications will continue to function). Each mobile device comprises a single wireless radio and has the ability to assess information relating to any device in which it is in wireless data communication such as node ID, RSSI value for a given link and similar information available under the 802.11g standard and/or known to the skilled practitioner. Moreover, each mobile device is configured to broadcast or advertise mesh network information if the RSSI value between it and a given access point exceeds a predefined threshold value (advertisement threshold value), and probe for a mesh network if the RSSI value between it and a given access point falls below a predefined threshold value (probe threshold value). In addition, each mobile device may be further configured to only advertise mesh network information to other mobile units whose MAC address is part of an access control list (ACL) that is accessible by the mobile device (this ACL can be stored in the mobile device or be managed by a network management system). The mobile devices can also be configured to only advertise mesh network information if a given access point's BSSID is also part of the ACL.

In the illustrated system, mobile device M2 is located in a poor coverage area, i.e., it is either unable to find a suitable wireless network to join, or, as shown, the RSSI value (R2) with respect to its closest AP (here, AP1) is very low. In the illustrated example of FIG. 4, the value of R2 (the RSSI between M2 and AP2) is below the value of T2 (the attributed value if M2 were located at the threshold of an acceptable data link with AP2). Because M2 is configured to probe for mesh network information if the RSSI between it and any access point falls below a predetermined value, M2 begins to probe for alternative access points or available mesh networks by sending layer 2 multicasts (P1), the content of which will be mesh networking information.

In the illustrated system, mobile device M1 is located in a good coverage area, i.e., the RSSI (R2) with respect to its closest AP (here, AP2) is very high. In the illustrated example of FIG. 4, the value of R1 (the RSSI between M1 and AP1) is above the value of T1 (the attributed value if M2 were located at the threshold of an acceptable data link with AP2). Because M1 is configured to advertise mesh network information if the RSSI between it and its access point exceeds a predetermined value, M1 begins to advertise its mesh network information.

Mobile device M1 is also configured to receive and respond to multicasts or probe requests. In the illustrated example of FIG. 4, the value of P1 exceeds the value of R1, M1 responds to M2 with the BSSID of AP1 and its average RSSI with AP1. When M2 receives the response it checks if the BSSID contained in the response is in its configured ACL. If the BSSID in the response is not in the ACL, the response is ignored. If the BSSID in the response is in the ACL, M2 requests to associate with the mesh network advertised by M1, where after M2 resends its data, which is then echoed to AP1 via M1 (because the base network protocol remains intact, data features such as security protocols are not frustrated or bypassed). Furthermore, because the protocol stacks are retained in both mobile devices, data destined for M1 will propagate up the stack, thereby preserving its operability as a unique network node.

A feature to the illustrated embodiment of FIG. 4 is that the association request by M2 may be encrypted using standard encrypting techniques. The association sequence becomes a simple challenge and response. Any mobile unit operating in a dynamic mesh network must be configured with the correct challenge and response. If the challenge/response succeeds, M1 will route all traffic from/to M2 to/from AP1. Each packet will contain routing information, so that M1 can distinguish mesh traffic from its own traffic.

What is claimed:

1. In a wireless data exchange network, a method comprising:
   determining, by a wireless mobile device (WMD), a state of a data exchange link between a wireless device (WD) and a wireless access point (AP), wherein the AP is operatively linked to the WD and a wired network;
   advertising mesh network information by the WMD if a first RSSI value exceeds an advertisement threshold value, wherein the first RSSI is between the WMD and the AP;
   probing for a mesh network by the WD if a second RSSI value falls below a probe threshold value, wherein the second RSSI is between the WD and the AP;
   selectively receiving and retransmitting data, by the WMD, from the WD to the AP and from the AP to the WD in order to dynamically establish a wireless data link between the WD and the AP wherein the WMD functions as a bridge there between, wherein selectively receiving and retransmitting data is based on whether the state of the data exchange link is below a threshold; and
   maintaining a wireless network communications protocol of the WMD during reception and retransmission of data between itself and the WD or the AP.

2. The method of claim 1 wherein the state of the data exchange between the WD and the AP is determined by assessing at least one value transmitted by one of the WD or the AP.

3. The method of claim 1 wherein the state of the data exchange between the WD and the AP is determined by comparing at least one value related thereto with at least one value transmitted by the WMD relating to the state of a data exchange link between the WMD and the AP.

4. The method of claim 2 wherein the at least one value transmitted by one of the WD or the AP is transmitted in response to a request from the WMD.

5. The method of claim 3 wherein the WMD transmits the at least one value only when the value exceeds a predetermined threshold.

6. The method of claim 3 wherein the at least one value transmitted by the WMD only when the at least one value transmitted by one of the WD or the AP has been received.

7. The method of claim 1 wherein the WD and the WMD comprise a single radio adapter.

8. The method of claim 1 wherein the wireless data exchange network further comprises a second AP operatively linked to the wired network and the WMD selects between linking with the AP or the second AP when functioning in a bridge mode.

* * * * *